United States Patent [19]

Stanish

[11] 4,202,510
[45] May 13, 1980

[54] RETRACTABLE PET LEASH

[76] Inventor: Walter F. Stanish, 118 Rochelle Ave., Philadelphia, Pa. 19128

[21] Appl. No.: 965,767

[22] Filed: Dec. 4, 1978

[51] Int. Cl.² ............................................. B65H 75/48
[52] U.S. Cl. ........................... 242/107.4 R; 242/107.6
[58] Field of Search ............................ 242/107–107.7, 242/99

[56] References Cited

U.S. PATENT DOCUMENTS

| | | | |
|---|---|---|---|
| 3,021,091 | 2/1962 | Swanson | 242/107.4 R X |
| 3,315,642 | 4/1967 | Rogers et al. | 242/107.4 R X |
| 3,853,283 | 12/1974 | Croce et al. | 242/107.6 X |
| 4,068,383 | 1/1978 | Krebs | 242/107.6 X |

*Primary Examiner*—John M. Jillions
*Attorney, Agent, or Firm*—Caesar, Rivise, Bernstein & Cohen, Ltd.

[57] ABSTRACT

A leash for animals comprising a housing having a rotatable reel disposed therein and about which a flexible tape is disposed. Releasable latch means are provided and operative for releasing the reel to enable the tape to be extended out of the housing against the opposition of spring biasing means. When the latch means is released the tape remains locked at any extended position. Release of the latch means causes the biasing means to retract the tape within the housing when the biasing force exceeds the tension on the tape. An open mouth clip is attached to the free end of the tape to enable the tape to be connected to the collar of an animal without removing the collar.

6 Claims, 5 Drawing Figures

U.S. Patent May 13, 1980 Sheet 1 of 2 4,202,510
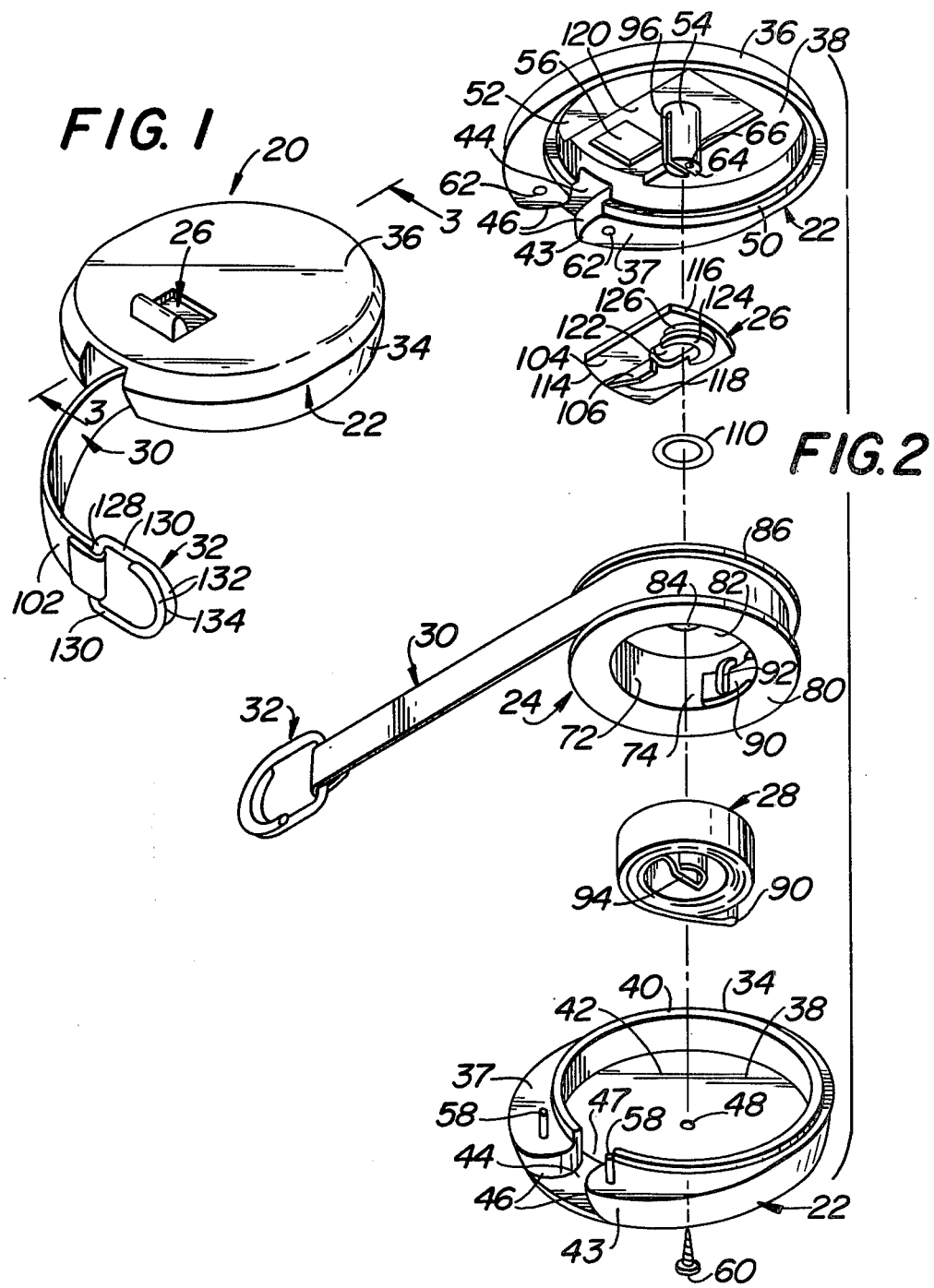

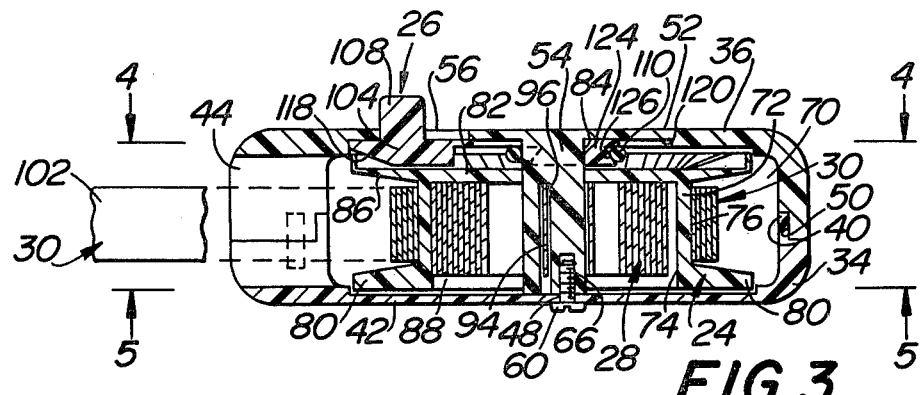
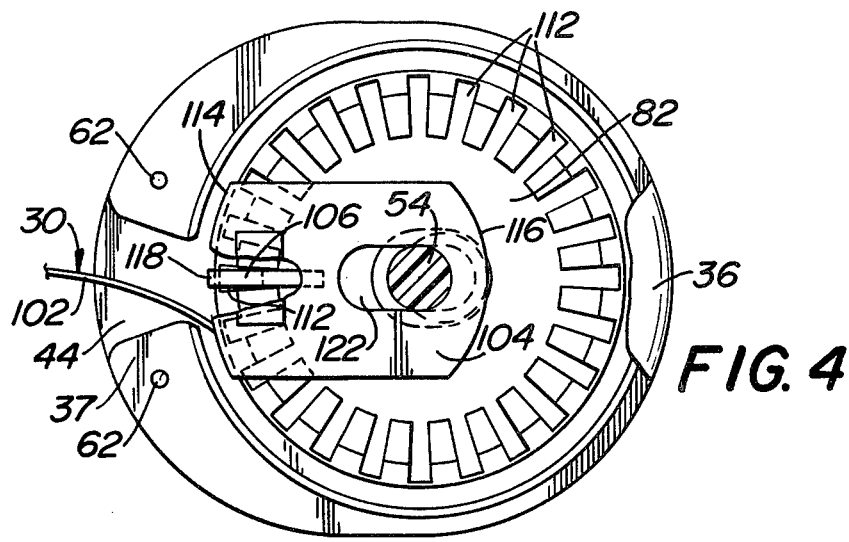
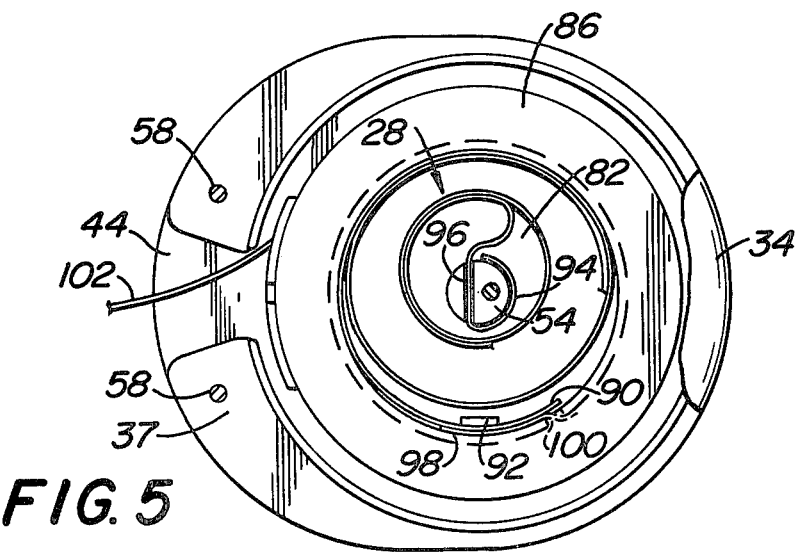

RETRACTABLE PET LEASH

This invention relates generally to animal leashes and, more particularly, to retractable pet leashes.

In a great many areas owners of pets are required by so-called "leash laws" to keep their pets on a leash whenever outdoors. Even where leash laws are not required pet owners normally make use of leashes to keep their animal under control. Commercially available leashes are normally in the form of a fixed-length web of material, e.g., a strap, a link chain, a braided cord, etc.

When walking an animal on a leash, it is desirable to keep the leash as short as possible, while still providing enough slack to give the animal some degree of mobility. When using conventional fixed-length leashes the leash must frequently be gathered up in one's hand to prevent excess slack when the animal is close to the handler and then let out when the animal wanders from the handler. This operation is cumbersome and inconvenient. Accordingly, many handlers merely unclip the leash and allow the pet to run loose, thereby obviating the safety advantages of a leash. Some handlers, in order to avoid bending over to unclip the leash, merely allow the leash to drop so that the animal can roam freely with the leash attached. Needless to say, this action is undersirable since the leash can get worn, dirty or snagged as the animal wanders.

Extendable-retractable leashes have been proposed. Such leashes include a housing from which the leash is pulled by the application of tension thereon, such as occurs when the animal pulls on the leash. The leash is automatically retracted as the tension on the leash decreases e.g., when the animal moves toward the handler. The retraction of the leash is usually accomplished by use of a spring. The spring continuously produces a strong retractive force on the leash. This action is undesirable since the animal's neck can be strained by the constant tension of the spring on the leash.

Accordingly, it is a general object of the instant invention to overcome the disadvantages of the prior art and provide a leash which overcomes the disadvantages of the prior art.

It is a further object of this invention to provide an extendable-retractable leash which enables the animal secured thereto to wander freely within the area encompassed by the maximum extension of the leash and without applying constant tension on its neck.

It is still a further object of the instant invention to provide a leash which enables the handler to actuate a means to enable the leash to be extended or retracted to any position and wherein the release of the means locks the leash in its last position and relieves all tension on the animal3 s neck.

It is yet a further object of the instant invention to provide an extendable-retractable leash which is rugged in construction, yet lightweight and sufficiently small to fit easily within the handler's palm.

These and other objects of the instant invention are achieved by providing a leash for animals comprising a housing, a rotatable reel disposed within the housing, releasable latch means coupled to said reel, biasing means applying a biasing force to said reel, and flexible tape means secured to and wound on said reel and having a free end to which a clip is secured. The free end of the tape extends out of the housing. The reel is rotatable in one direction when the latch means is released to permit the tape to be unwound from the reel and extended out of the housing by the application of tension thereon which exceeds the biasing force applied to the reel. The reel is also rotatable in the opposite direction when the latch means is released to rewind the tape on the reel when the biasing force exceeds the tension on the tape. The latching means, when locked, precludes the reel from rotating in either direction, whereupon the length of tape extended from the housing remains constant.

Other objects and many of the attendant advantages of this invention will be readily appreciated as the same becomes better understood by reference to the following detailed description when considered in connection with the accompanying drawing wherein:

FIG. 1 is a perspective view of the extendable-retractable animal leash of the instant invention;

FIG. 2 is an exploded perspective view of the extendable-retractable animal leash shown in FIG. 1;

FIG. 3 is an enlarged sectional view taken along line 3—3 of FIG. 1;

FIG. 4 is a sectional view taken along line 4—4 of FIG. 3; and

FIG. 5 is a sectional view taken along line 5—5 of FIG. 3.

Referring now to the various figures of the drawing wherein like reference characters refer to like parts, there is shown in FIG. 1 an extendable-retractable animal leash device 20 in accordance with the instant invention. The device 20 basically comprises a housing 22, a rotatable reel 24 (FIG. 2) disposed within the housing, releasable latch means 26 coupled to the reel, biasing means 28 (FIG. 2) coupled to the reel and flexible tape means 30 secured to and wound on the reel and having a free end on which a clip 32 is secured. The clip is arranged to be releasably secured to the collar of the animal (not shown).

The reel 24 is rotatably mounted within the housing 24. As will be described in detail later the device is constructed so that release of the latch means 26 frees the tape to be unwound from the reel and pulled out of the housing if the pull or tension applied to the free end of the tape, e.g., the animal's pull, exceeds the biasing force produced by the biasing means 26. The engagement of the latch means locks the reel at any position to prevent the tape from being extended out of or being retracted into the housing from its then existing position. The tape is automatically withdrawn or retracted to the housing upon release of the latch means if the tension on the tape is less than the biasing force of biasing means 26.

As can be seen in FIG. 2 the housing 22 comprises a pair of mating sections 34 and 36. Each section 34 and 36 is a generally hollow member of slightly oval shape and having a peripheral wall 37 whose outer edge is rounded slightly. The member 34 includes a circular well 38 formed by a circular collar 40 and a bottom wall 42. The sidewall 37 is substantially thicker at its front end 43 and includes an outlet or mouth 44 in the form of an opposed pair of flared side walls 46. The collar 40 includes a slot 47 contiguous with mouth 44. A hole 48 extends through the bottom wall 42 of the section 34 close to the center of the circular well 38.

The housing section 36 is of similar overall shape to section 34 and includes a peripheral wall 37 having a thickened front end 43 and a circular well 38 and about which a circular ledge 50 extends. The well 38 also includes a flared mouth 44 formed like the mouth of section 34. The bottom wall 52 of the well 38 of section 36 includes an upwardly projecting shaft 54 located at the center of the well. A rectangular opening or slot 56 is provided in the bottom wall 52 between the mouth 44 and the shaft 54. The slot 56 is adapted to receive a button, to be described in detail later, forming a portion of the latch means 26.

The housing sections 34 and 36 are arranged to be secured together with the circular collar 40 of section 34 disposed within the circular ledge 50 of section 36 and with the mouth portion 44 of each section disposed opposite one another to form a passageway through which the tape 30 passes. The alignment and securement of the sections 34 and 36 together is accomplished by a pair of locating pins 58 which project out of sidewall portion 37 of section 34 on either side of its mouth 44 and by a screw 60. To that end, the pins 58 are arranged to be received in respective holes 62 located in the sidewall portion 37 of the section 36 on opposite sides of its mouth 44. The top 64 of the shaft 54 is planar and includes a hole 66 therein which is aligned with the hole 48 in the section 34 when the sections 34 and 36 are mated. The screw 60 is extended through the hole 48 and into the hole 66 in the shaft 54 to secure the two housing sections 34 and 36 together.

When the sections 34 and 36 are secured together a housing, having a circular central cavity 70 (FIG. 3), is created. Entrance to the cavity 70 is provided by the outwardly flared mouth 44. In accordance with a preferred embodiment of the instant invention and as can be seen in FIG. 2, 4 and 5, the corners of the mouth 44 are curved to present a smooth surface to the tape 30. This feature is important to prevent damage to the tape 30 when it is extended out of the mouth 44 of the housing 22.

The reel 24, tape 30, biasing means 28 and latching means 26 are all located within the housing's circular cavity 70.

As can be seen in FIGS. 2-5, the reel 24 is of generally circular shape and includes a cylindrical central hub 72 having an inner surface 74 and an outer surface 76. A planar circular flange 80 projects outward from the outer surface 76 on one side thereof. The other side of the hub 72 includes a planar sidewall 82 having a central opening 84 and terminates in a flange 86 projecting outward from the surface 76. The reel 24 is located within the circular cavity 70 of the housing, with the shaft 54 of the section 36 extending through central opening 84 in the reel. Thus, the shaft 54 forms an axle about which the reel is enabled to rotate.

As can be seen in FIG. 3 the internal peripheral surface 74 of the reel and the side wall 82 form an annular space 88 about the shaft 56. The biasing means 28 is located within the annular space 88.

As can be clearly seen in FIGS. 2, 3 and 5 the biasing means 28 is in the form of a helical spring which comprises a web of a resilient material, rolled up into a spiral. The outer end 90 (FIG. 5) of the spring is connected to a portion of the inside peripheral surface 74 of the reel 24 by a clip 92. The other end of the spring 28, that is, the inner end 94, is secured to the central shaft 54. To that end the central shaft 54 includes a slot 96 extending parallel to the longitudinal axis of the shaft and opening at the top end 64 of the shaft. The inner end 94 of the spring is extended through the slot 96 and bent back over itself to form a loop around the shaft 56 to fixedly secure the end of spring 28 to the shaft, and hence to the housing.

In accordance with a preferred embodiment of the invention the spring 28 is formed of a highly resilient material, e.g., spring steel. Accordingly, when the spring is wound into a spiral and connected as shown and described it produces a biasing force on the reel 24 opposing the rotation of the reel about the hub in the direction in which the spring is wound, since such action causes the spring to coil more tightly about itself.

As mentioned heretofore the releasable latching means 26 is provided to lock the reel in any rotatable position, irrespective of the tension on the spring, when the means 26 is in the locked position. Conversely, when the latching means 26 is released the reel is enabled to rotate about the shaft 54 either clockwise or counter-clockwise, depending upon the relative magnitude of the tension applied to the tape as compared to the biasing force produced by the spring, as will be described hereinafter.

The tape 30 comprises an elongated web of flexible material, such as fiberglass-reinforced plastic, and is secured to and wound in a spiral about the hub of reel 24. To that end, the inner end 98 of the tape 30 extends through an opening 100 in the reel's hub 72 and is secured to its inner surface 74 adjacent the opening 100 by suitable means, such as an adhesive, e.g., epoxy. The tape is spirally wound about the hub in the same direction as that of the spring 28. The free end 102 of the tape 30 extends out of the mouth 44 of the housing. The hook 32 is attached to the free end 96 of the tape by folding the tape back over itself about the clip and securing the abutting tape portion by suitable means, e.g., adhesive.

As will be appreciated by those skilled in the art, the application of tension to the free end 102 of the tape, if in excess of the biasing force produced by spring 28, causes the reel 24 to rotate about shaft 54 in the counter-clockwise direction as viewed in FIG. 5 so that the tape unwinds or plays from the reel and extends out of mouth 44. Release of the free end allows the biasing force produced by the spring to rotate the reel in the opposite rotational direction about shaft 56, whereupon the tape is rewound onto the reel.

The details of the latching means can best be appreciated by reference to FIGS. 2, 3 and 4. As can be seen therein, the latching means 26 basically comprises a latch plate 104 having a projecting finger 106 and an actuating button 108 and resilient means 110 interconnected between the latch plate and the housing 22 of the device 20. The latch plate is arranged to be normally held within a "locked position" by the resilient means 110, whereupon the finger 106 is extended into an aligned notch 112, to be described in detail hereinafter, in the reel to preclude the reel from rotating about the shaft 54. The button 108 is provided to retract the plate 104 to a "release position" wherein the finger 106 is withdrawn from the notch 112 when the button is depressed by the user, as will be described later. This action frees the reel for rotation about shaft 54.

As shown clearly in FIG. 3 and 4, the upper flange 86 of the reel 24 is thickened contiguous with its peripheral edge. A plurality of grooves 112 are cut at equidistantly spaced locations in the thickened portion of the flange 86. The grooves 112 each extend in a radial direction and are open at the inner end of the flange to permit the flange 106 to pass therethrough.

As can be seen in FIG. 4 the latch plate 104 is a thin generally planar member having an arcuate forward edge 114 and an arcuate rear edge 116. The finger 106 is an elongated projection extending longitudinally along the underside 118 (FIG. 2) of the plate 104 and contiguous with the forward edge 114.

The forward edge 118 of the finger is bevelled.

The actuating button 108 comprises a rounded tab projecting from the top surface of latch plate 104 opposite the finger 106. The plate is disposed within a shallow depth recess 120 (FIG. 2) in the inner surface of the wall 52 of the housing section 36 so that the finger is located immediately adjacent the top flange 86 of the reel 24 and with the actuating button 108 extending through slot 56 in the housing section 36. An elongated slot 122 having rounded ends is provided in the center of the plate 104 and through which the shaft 54 extends when the plate is located in place. The portion of the plate contiguous with the slot 122 and disposed closest to the rear edge of the plate is in the form of a thickened ledge 124 (FIG. 2) and having a peripheral groove 126. The resilient means 110 is preferably a rubber O-ring which encircles the shaft 54 and the ledge 124 and is disposed within the groove 126. The O-ring closely engages the encircled portions to normally hold the plate in the "locked position" shown in FIGS. 3 and 4. In this position the finger 106 is located within the notch 112 which is located directly opposite to it. The location of the finger within the notch prevents rotation of the reel about the shaft. Pressing the actuating button 108 in the direction toward the shaft 54 overcomes the biasing force provided by the O-ring 110 on the plate 104 and causes the plate to move in that direction. When the plate has been moved to the position at which the bevelled end of its finger is located outside of the notch 112, in which it had been disposed, the reel is released or unlatched. The unlatching of the reel enables it to be rotated in either rotational direction about shaft 56, depending on the amount of tension on the tape. Accordingly, release of the button 108 allows the tape to unreel from the reel whenever the pull on the tape exceeds the bias produced by the coiled spring 28. If the pull on the tape is less than the bias force, the spring causes the reel to rotate and wind the tape thereabout, thus retracting the tape within the housing.

The clip 32 of the leash 20 is arranged to permit its releasable securement to the collar of the animal without requiring removal of the collar by merely folding the free end of the tape back over itself around the animal collar and into the clip. To that end the clip comprises a base 128 from which a pair of side legs 130 project. Each side leg terminates in an arcuate free end portion 132. The free end portions are disposed side-by-side and touch one another to form an openable slit 134 therebetween. As mentioned heretofore the clip is secured to the free end of the tape.

In accordance with a preferred aspect of this invention the clip is formed of a resilient material, e.g., metal, so that its free end 132 can be separated thus opening the slit 134. This action enables the tape to be looped over itself and around the animal collar to form a slip knot by inserting the looped portion of the tape within the slit 134.

Without further elaboration, the foregoing will so fully illustrate my invention, that others may, by applying current or future knowledge, adopt the same for use under various conditions of service.

What is claimed as the invention is:

1. A leash for animals comprising a housing sufficiently small to be held within a user's palm, a rotatable reel disposed within said housing, releasable latch means coupled to said reel, biasing means applying a biasing force to said reel and flexible tape means, said housing including a pair of opposed sidewalls, one of said sidewalls having a shaft projecting inward therefrom for securement to the other sidewall, said reel comprising a central hub having an opening through which said shaft extends and a pair of circular flanges projecting outward from said hub, one of said flanges including a plurality of substantially rectangular radially extending slots, each of which opens to the periphery of said flange, said tape means being secured to and wound on said hub and having a free end to which a clip is secured, said biasing means comprising a helical spring located within the opening in said central hub and connected between said reel and said shaft, said latch means comprising a resilient band, a latch plate having an elongated opening through which said shaft extends, a ledge disposed adjacent said opening, an elongated finger mounted on said plate parallel to said one flange and actuator means mounted on said plate projecting through an opening in one of said sidewalls, said resilient band being disposed about said shaft and said ledge, said finger being an elongated member arranged for reciprocal movement parallel to said one flange between a locked position and a released position, said band automatically moving said finger to said locked position wherein said finger is radially extended fully into a slot in said flange, said finger being movable to said released position by movement of said actuator parallel to said flange against the action of said resilient band, whereupon said finger is retracted fully from said slot, when said latch means is in said released position said reel being rotatable in one direction to permit said tape to be unwound from the reel and extended out of the housing by the application of tension thereon which exceeds said biasing force, said reel being rotatable in the opposite direction when said latch means is in said released position to rewind the tape on the reel when the biasing force exceeds the tension on said tape, said reel being precluded from rotating in either direction when said latch means is in said locked position, whereupon the length of tape extended from the housing remains constant.

2. The leash of claim 1 wherein said tape is formed of plastic.

3. The leash of claim 2 wherein said plastic is reinforced with fiberglass.

4. The leash of claim 1 wherein said clip includes a base portion to which said tape is secured and a pair of side legs connected to opposite ends of said base portion, said side legs each terminating in a free end extending over said base portion and being spaced slightly from each other to permit a loop of tape to pass therethrough to form a slipknot for securing the tape to the collar of said animal.

5. The leash of claim 4 wherein each free end is arcuate.

6. The leash of claim 5 wherein said clip is formed of metal.

* * * * *